March 25, 1958     B. L. BLUBAUGH     2,828,136
ELEVATOR BEDDED IMPLEMENT TRANSPORT
Filed March 25, 1957
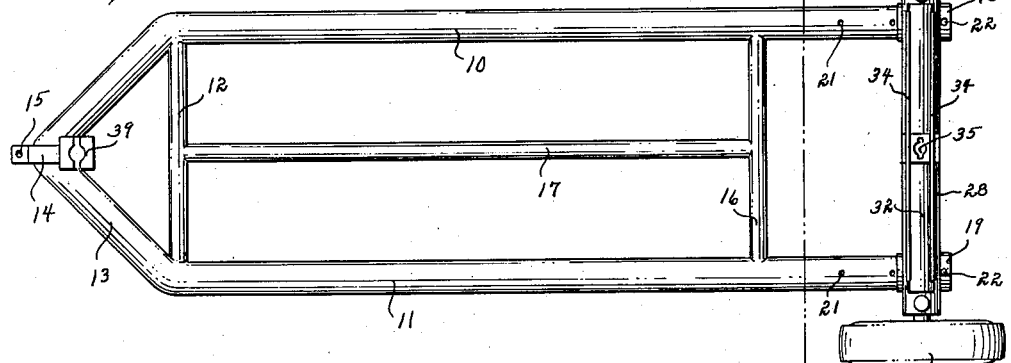
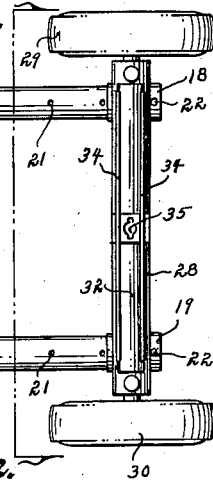
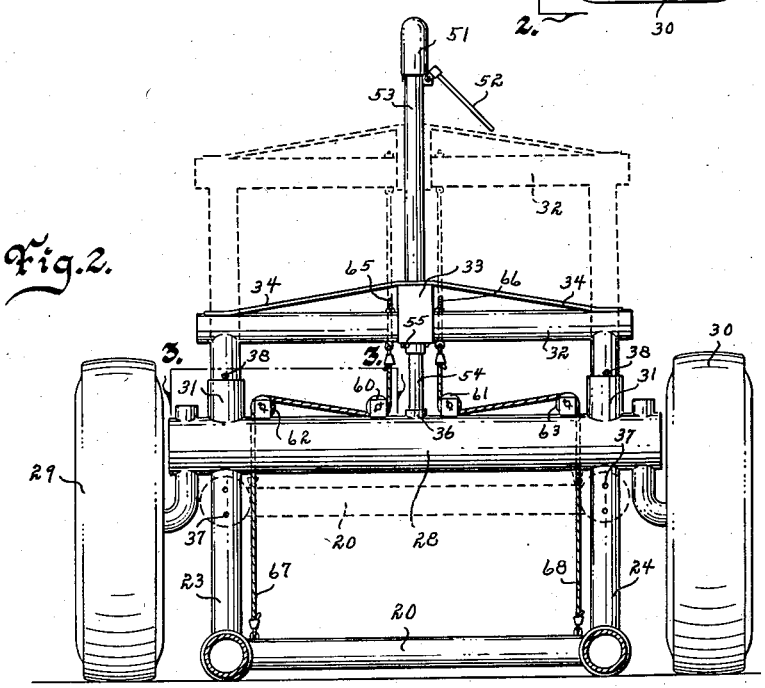
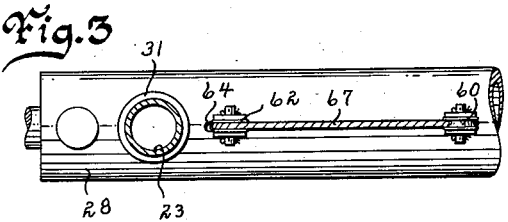
Inventor
Bernard L. Blubaugh
by M. Talbert Dick
Attorney
Witness
Edward P. Seeley

United States Patent Office 2,828,136
Patented Mar. 25, 1958

2,828,136

ELEVATOR BEDDED IMPLEMENT TRANSPORT

Bernard L. Blubaugh, Medford, Okla.

Application March 25, 1957, Serial No. 648,304

5 Claims. (Cl. 280—44)

This invention relates to a means for transporting implements and like and, more particularly, to one that may be lowered to a ground position for receiving driven or pulled on wheeled farm equipment. It is an improvement on the structure shown in my application for United States Letters Patent on an Implement Transport, filed December 5, 1956, Serial Number 626,525.

The transporting of machinery, and especially farm equipment, has become a serious problem. Due to mechanized farming, an individual may now farm several places, and these places are often separated, thereby necessitating the movement of farm equipment over the available road net. Often the farm equipment is not capable of rapid movement on the road or highway. Furthermore, some equipment such as discs, harrows, and like, are most damaging to the road surface. It is for these reasons that much effort has been put forth in recent times to facilitate equipment transportation. The usual method has been to drive a wheeled frame over the object to be transported, and then elevate the object onto the frame. The chief objection to this method is that seldom will one such wheeled frame accommodate more than one type of equipment.

While the structure shown in my co-pending application, herebefore referred to, overcame many of these disadvantages, it did have a tendency to bind when it was elevated with a load having a center of gravity at one side of the longitudinal center axis of the bed. This situation often arises when such items as grain drills are placed on the bed.

Therefore, one of the principal objects of this invention is to provide an equipment transporting means that has a carriage bed capable of being raised or lowered without binding or tipping.

A still further object of my invention is to provide an implement transporting means that will receive or discharge an implement from either said direction.

A still further object of my invention is to provide a vertically adjustable implement transporting means for use in conjunction with a tractor or like that requires only two supporting wheels.

A still further object of my invention is to provide transporting means for equipment that is constructed chiefly of cylindrical tubing.

Still further objects of this invention are to provide a trailer transporting means that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a top plan view of my implement transport,
Fig. 2 is a cross sectional view of my transport taken on line 2—2 of Fig. 1 and illustrating the rear end of the device with broken lines showing the position of parts when the carriage bed is in elevated condition, and Fig. 3 is an enlarged horizontal sectional view taken on line 3—3 of Fig. 2 and more fully illustrates its construction.

The frame structure of my equipment is substantially that as shown and illustrated in my co-pending application. While I have indicated the use of my device as especially adapted for the transportation of farm equipment over roads and highways, obviously it not only can be used for transporting farm equipment through gates, narrow passageways, and like, but also for moving farm equipment from one field to the other, or for moving the equipment from its storage area to point of use in a field. Also, my device can be used successfully for transporting non-farm objects.

Referring to the drawings, the platform per se is constructed of cylindrical tubing or pipes. The numerals 10 and 11 designate two spaced apart elongated horizontal side beams. These two beams are connected at their forward ends by a horizontal tube or pipe 12. The numeral 13 designates a continuation of the forward ends of the members 10 and 11 and which extend forwardly and inwardly to provide a pointed forward end tongue portion. On the forward end area of the portion 13 is a clevis 14 for embracing the drawbar or like of a pulling vehicle such as a tractor. (Not shown.) The numeral 15 designates the usual holes in the clevis for receiving the drawbar pin. The numeral 16 designates a tubular cross brace between the beams 10 and 11 and located a substantial distance forward of the rear ends of the beams 10 and 11, as shown in Fig. 1. The numeral 17 designates an elongated pipe connecting the central area of the element 12 with the central area of the element 16. The numeral 18 designates a sleeve slidably mounted on the rear portion of the beam 10. The numeral 19 designates a similar sleeve slidably mounted on the rear end portion of the beam 11. The numeral 20 designates a tubular cross member connecting the sleeve 18 with the sleeve 19. The numeral 21 designates vertical holes through the sleeves 18 and 19 and through the tubular beams 10 and 11. The numeral 22 designates pins for selectively extending through the holes 21 for adjustably securing the sleeves 18 and 19 against sliding action on the beams 10 and 11. Extending vertically upwardly from the sleeve 18 is a tube shaft 23. A similar tube shaft 24 extends upwardly from the sleeve 19. These parts just described make up the major portion of the platform phase of my invention.

The numeral 28 designates an axle means, the central portion of which, at least, is of tubular construction. Rotatably mounted on the two ends of this axle means are two supporting wheels 29 and 30, as shown in Fig. 2. The posts 23 and 24 extend slidably upwardly through the central tubular section of axle 28, as shown in Fig. 2. The numeral 31 designates a stub supporting sleeve embracing each of the posts 23 and 24 and connected to the upper side of the axle 28. These sleeves 31 aid the axle means in maintaining the posts 23 and 24 in upright sliding action with the axle. The numeral 32 designates a tubular crossbar connecting the upper ends of the posts 23 and 24 and which extends parallel horizontally in space relationship above the axle 28. The numeral 33 designates a box element secured around the central area of the crossbar 32. This box element 33 extends above the plane of the crossbar tube 32 and has braces 34 extending from its top downwardly and outwardly in both directions to the cross member 32, as shown in Fig. 2. The numeral 35 designates a vertical passageway or holes through the top, through the cross member 32 and through the bottom of the box portion 33, as shown in Fig. 1. The numeral 36 designates a well socket secured on the center top of the axle 28 and in a plane directly below the passageway or holes 35. The elements 18, 19, 20, 23, 24 and 32 are constructed of cylindrical tubing and may be considered as a frame means on the rear of the platform that is vertically slidable relative to the axle 28.

The numeral 37 designates one or more holes in each of the posts 23 and 24. These holes are adapted to selectively detachably receive holding pins, bolts, or like, 38, for preventing the downward sliding movement of the posts 23 and 24 through the axle 28 at times. The numeral 39 designates a vertical cylinder secured to the inside forward end of the tongue portion 13, as shown in Fig. 1. This part 39 is to be used in jacking up or lowering the front end of the device. If the distance between the axle 28 and cross element 32 is increased, the rear end of the platform will be elevated. Any suitable means, such as a manual jack, hydraulic jack or lever means may be used to either raise the front end, or for placement between the axle 28 and cross element 32. For most purposes, I recommend the use of an ordinary hand operated jack, generally designated by the numeral 51 and having the actuating handle 52, cylinder 53 and piston 54. The only modification of such a jack to meet the purposes required is the installation of two diametrically extending lugs 55 on the lower end portion of its cylinder 53, as shown in Fig. 2. Such a jack can be used for controlling the lowering of the platform or the raising of the platform relative to the ground surface. Assuming that the platform is resting on the ground surface, as shown in Fig. 2, and the object to be transported has been moved onto the platform, it is a simple procedure to raise the platform with its load for transportation purposes. This may be accomplished with a single jack by raising first one end of the device and then the other end. In raising the rear end of the platform, the jack is inserted downwardly through the passageway or holes 35, and then rotated one quarter of a turn to bring its lugs 55 under the box portion 33. With the lower end of the piston 54 of the jack in the socket 36 located on the axle 28, the actuation of the jack 51 will cause the piston 54 to move from the jack cylinder 53, thereby moving the cross member 32 away from the axle 28. This action will raise the posts 23 and 24, thereby elevating the rear end of the platform. After the posts 23 and 24 have been elevated, the pin 38 is extended through a hole 37 in each of the posts 23 and 24. These pins will extend through the posts and above the sleeves 31, thereby preventing the downward movement of the posts 23 and 24 from their elevated positions. The jack may then be removed for raising the front end of the transport for attachment to the pulling vehicle. While in the drawings I show a two wheeled transport, obviously a four wheeled one may be used. In such case, the front end would be a substantial duplicate of the rear end. With the carriage bed in lowered position on the ground, as shown in Fig. 2, the implement or like to be transported is moved from either side onto the carriage bed. As before indicated, unless the equipment is perfectly balanced (from a weight standpoint) on the central line of the bed, the carriage will tilt laterally thereby binding the members 23 and 24 in the sleeve bearings 31. Inasmuch as it is almost impossible to properly distribute the load on the carriage bed, it was necessary to provide a means for preventing this undesirable tipping and binding during the raising and lowering of the carriage bed under load. Closely adjacent each side of the socket 36 I mount on the top of the axle 28 a vertical pulley wheel. These two pulley wheels are designated by the numerals 60 and 61, respectively. The numeral 62 designates a vertical pulley wheel mounted on the top of the axle 28 near the post 23. A similar vertical pulley wheel 63 is mounted on the top of the axle 28 near the post 24. The numeral 64 designates a vertical hole extending through the axle 28 adjacent each of the pulley wheels 62 and 63 as shown in Fig. 3. The numeral 65 designates a vertical I-bolt slidably extending through the cross member 32 and above the pulley wheel 60. A similar eye-bolt 66 extends through the cross member 32 above the pulley wheel 61. The numeral 67 designates an elongated flexible member such as a chain, rope, cable or like. In the drawings, this member is in the form of a metallic cable and has its lower end secured to the cross member 20 at a point adjacent the post 23. This cable extends upwardly through the hole 64, over the pulley wheel 62, thence under the pulley wheel 60, and thence upwardly and connected to the eye-bolt 65. The numeral 68 designates a similar cable or like having its lower end secured to the cross member 20 near the post 24, then extends upwardly through a hole 64 in the axle 28, thence over the pulley wheel 63, thence under the pulley wheel 61, and thence upwardly and connected to the eye-bolt 66. By this arrangement of parts the two cables will maintain the sides of the carriage bed in a common horizontal plane and perpendicular to the sleeve bearings 31, thus preventing lateral bed tilting and resultant binding. As the pulley wheels 60 and 61 are closely adjacent the jack, the cables will pull up evenly the heaviest side of the carriage bed. The proper attitude of the carriage bed will be maintained throughout its upward movement and also its downward movement. However, the cables must be of proper length to each other and the length of each cable may be independently adjusted by the eye bolt secured to its upper end.

Some changes may be made in the construction and arrangement of my elevator bedded implement transport without departing from the real spirit and purpose of my invention, and it is my intention to cover by my claims, any modified forms of structure or use of mechanical equivalents which may be reasonably included within their scope.

I claim:

1. In a transporting device, a horizontal platform, an axle means, a wheel rotatably mounted on each end portion of said axle means, two vertical post members extending upwardly from said platform and each slidably extending through said axle means, a cross beam connecting the two post members together at points above the plane of said axle means, an expandable jack means between said cross beam and said axle means at a point near the central length of said cross beam and said axle means, a pulley wheel on said axle means near one side of said jack means, a second pulley wheel on said axle means near the other side of said jack means, a third pulley wheel on said axle means near one of said posts, a fourth pulley wheel on said axle means adjacent the other said post, a cable operatively connected at its lower end to the lower end portion of one of said posts, engaging said first and third pulley wheels and having its upper end connected to said cross beam at a point adjacent said jack means, and a second cable operatively connected at its lower end to the lower end portion of said other post, engaging said second and fourth pulley wheels and having its upper end connected to said cross beam at a point adjacent said jack means.

2. In a transporting device, a horizontal platform, an axle means, a wheel rotatably mounted on each end portion of said axle means, two vertical post members extending upwardly from said platform and each slidably extending through said axle means, a cross beam connecting the two post members together at points above the plane of said axle means, an expandable jack means between said cross beam and said axle means at a point near the central length of said cross beam and said axle means, a pulley wheel on said axle means near one side of said jack means, a second pulley wheel on said axle means near the other side of said jack means, a third pulley wheel on said axle means near one of said posts, a fourth pulley wheel on said axle means adjacent the other said post, a cable operatively connected at its lower end to the lower end portion of one of said posts, extending upwardly through said axle means, engaging said first and third pulley wheels and having its upper end connected to said cross beam at a point adjacent said jack means, and a second cable operatively connected at its lower end to the lower end portion of said other post, extending upwardly through said axle means, engaging said second and fourth pulley wheels and having its upper end connected to said cross beam at a point adjacent said jack means.

3. In a transporting device, a horizontal platform, an axle means, a wheel rotatably mounted on each end portion of said axle means, two vertical post members extending upwardly from said platform and each slidably extending through said axle means, a cross beam connecting the two post members together at points above the plane of said axle means, an expandable jack means between said cross beam and said axle means at a point near the central length of said cross beam and said axle means, a pulley wheel on said axle means near one side of said jack means, a second pulley wheel on said axle means near the other side of said jack means, a third pulley wheel on said axle means near one of said posts, a fourth pulley wheel on said axle means adjacent the other said post, a cable operatively connected at its lower end to the lower end portion of one of said posts, engaging said first and third pulley wheels by extending over the third pulley wheel and under the first pulley wheel and having its upper end connected to said cross beam at a point adjacent said jack means, and a second cable operatively connected at its lower end to the lower end portion of said other post, engaging said second and fourth pulley wheels by extending over said fourth pulley wheel and under the second pulley wheel, and having its upper end connected to said cross beam at a point adjacent said jack means.

4. In a transporting device, a horizontal platform, an axle means, a wheel rotatably mounted on each end portion of said axle means, two vertical post members extending upwardly from said platform and each slidably extending through said axle means, a cross beam connecting the two post members together at points above the plane of said axle means, an expandable jack means between said cross beam and said axle means at a point near the central length of said cross beam and said axle means, a pulley wheel on said axle means near one side of said jack means, a second pulley wheel on said axle means near the other side of said jack means, a third pulley wheel on said axle means near one of said posts, a fourth pulley wheel on said axle means adjacent the other said post, a cable operatively connected at its lower end to the lower end portion of one of said posts, engaging said first and third pulley wheels and having its upper end connected to said cross beam adjustable eye-bolts at a point adjacent said jack means, and a second cable operatively connected at its lower end to the lower end portion of said other post, engaging said second and fourth pulley wheels and having its upper end connected to said cross beam adjustable eye-bolts at a point adjacent said jack means.

5. In a transporting device, a horizontal platform, an axle means, a wheel rotatably mounted on each end portion of said axle means, two vertical post members extending upwardly from said platform and each slidably extending through said axle means, a cross beam connecting the two post members together at points above the plane of said axle means, an expandable jack means between said cross beam and said axle means at a point near the central length of said cross beam and said axle means, a pulley wheel on said axle means near one side of said jack means, a second pulley wheel on said axle means near the other side of said jack means, a third pulley wheel on said axle means near one of said posts, a fourth pulley wheel on said axle means adjacent the other said post, a cable operatively connected at its lower end to the lower end portion of one of said posts, engaging said first and third pulley wheels and having its upper end connected to said cross beam at a point adjacent said jack means, a second cable operatively connected at its lower end to the lower end portion of said post, engaging said second and fourth pulley wheels and having its upper end connected to said cross beam at a point adjacent said jack means, and a means for adjusting the operative length of at least one of said cables.

References Cited in the file of this patent

UNITED STATES PATENTS

| | | |
|---|---|---|
| 1,005,979 | Kalbaugh | Oct. 17, 1911 |
| 1,853,837 | Trott | Apr. 12, 1932 |
| 2,648,546 | Falkenhagen | Aug. 11, 1953 |